US012596810B2

(12) United States Patent
Mehta et al.

(10) Patent No.: US 12,596,810 B2
(45) Date of Patent: Apr. 7, 2026

(54) AUTOMATED APPLICATION PROGRAMMING INTERFACE (API) TESTING

(71) Applicant: Cequence Security, Inc., Sunnyvale, CA (US)

(72) Inventors: Shreyans Mehta, Los Altos, CA (US); Abraham Jeevagunta, San Jose, CA (US)

(73) Assignee: Cequence Security, Inc., Santa Clara, CA (US)

( * ) Notice: Subject to any disclaimer, the term of this patent is extended or adjusted under 35 U.S.C. 154(b) by 136 days.

(21) Appl. No.: 18/520,830

(22) Filed: Nov. 28, 2023

(65) Prior Publication Data

US 2024/0176892 A1 May 30, 2024

Related U.S. Application Data

(60) Provisional application No. 63/385,428, filed on Nov. 30, 2022.

(51) Int. Cl.
| | |
|---|---|
| *G06F 21/00* | (2013.01) |
| *G06F 21/57* | (2013.01) |
| *G06F 21/62* | (2013.01) |

(52) U.S. Cl.
CPC .......... *G06F 21/577* (2013.01); *G06F 21/629* (2013.01); *G06F 2221/033* (2013.01)

(58) Field of Classification Search
CPC ................. G06F 21/577; G06F 21/629; G06F 2221/033; H04L 63/1433
See application file for complete search history.

(56) References Cited

U.S. PATENT DOCUMENTS

| | | | | |
|---|---|---|---|---|
| 11,138,033 B1* | 10/2021 | Sem | .......................... | G06F 9/54 |
| 2003/0009696 A1 | 1/2003 | Bunker et al. | | |
| 2012/0240235 A1* | 9/2012 | Moore | ................ | H04L 63/1433 726/25 |

(Continued)

OTHER PUBLICATIONS

International Search Report & Written Opinion for PCT Application No. PCT/US2023/081253, mailed Mar. 22, 2024; 11 pages.

(Continued)

*Primary Examiner* — Ghazal B Shehni

(57) ABSTRACT

Various embodiments facilitate Application Programming Interface (APIs) testing. In some examples, an apparatus detects security vulnerabilities in an API. The apparatus comprises one or more computer-readable storage media, a processing system operatively coupled with the one or more computer-readable storage media, and program instructions stored on the one or more computer-readable storage media. When executed by the processing system, the program instructions direct the processing system to perform operations. The apparatus monitors API traffic and responsively generates contextual information that characterizes the operations of the API. The apparatus generates an API test based on the contextual information to detect the security vulnerabilities in the API. The apparatus executes the API test on the API. The apparatus generates test results that indicate detected security vulnerabilities in the API. The processing system exports the test results.

20 Claims, 6 Drawing Sheets

(56) References Cited

U.S. PATENT DOCUMENTS

2017/0223043 A1*  8/2017 Munoz ................... H04L 63/20
2018/0255089 A1*  9/2018 Wilton ............... H04L 63/1433
2020/0366756 A1* 11/2020 Vittal ................... H04L 43/045
2021/0021643 A1*  1/2021 Nakagoe ................ H04L 67/34
2022/0269789 A1*  8/2022 Norden ................ G06F 21/552

OTHER PUBLICATIONS

Owasp: "REST Security—OWASP Cheat Sheet Series", Oct. 24, 2022, (Oct. 24, 2022), URL:https://web.archive.org/web/20221024000325/https://cheatsheetseries.owasp.org/ch eatsheets/REST_Security_Cheat_Sheet.html.

* cited by examiner

MONITORING API TRAFFIC TO COLLECT CONTEXTUAL INFORMATION THAT CHARACTERIZES THE OPERATIONS OF THE API. — 201

GENERATING AN API TEST BASED ON THE CONTEXTUAL INFORMATION TO DETECT SECURITY VULNERABILITIES IN THE API. — 202

RUNNING THE TEST ON THE API. — 203

GENERATING TEST RESULTS THAT INDICATE DETECTED SECURITY VULNERABILITIES IN THE API. — 204

EXPORTING THE TEST RESULTS. — 205

200

600

COMPUTING SYSTEM 601

STORAGE SYSTEM 602

SOFTWARE 603

API TESTING PROCESS 610

COMMUNICATION AND INTERFACE SYSTEM 604

PROCESSING SYSTEM 605

USER INTERFACE SYSTEM 606

AUTOMATED APPLICATION PROGRAMMING INTERFACE (API) TESTING

CROSS-REFERENCE TO RELATED APPLICATIONS

This U.S. patent application claims the benefit of and priority to U.S. Provisional Patent Application 63/385,428 titled, "AUTOMATED APPLICATION PROGRAMMING INTERFACE (API) TESTING" which was filed on Nov. 30, 2022, and which is hereby incorporated by reference into this U.S. patent application in its entirety.

TECHNICAL FIELD

Various embodiments of the present technology relate to web service security, and more specifically, to testing Application Programming Interfaces (APIs) to detect security vulnerabilities.

BACKGROUND

Security of a web service is of upmost importance to both the operators of the website and its users. As more people utilize the Internet to communicate and conduct business transactions and other services, more threats to website security arise. Website owners, insurers, hosting services, and others involved in the provision of a web service typically strive to create a robust security infrastructure for a website to prevent nefarious individuals from compromising the site. However, despite these security precautions, a website could still be subject to intrusions by computer hackers, malware, viruses, and other malicious attacks. Websites may be vulnerable to security breaches for a variety of reasons, including security loopholes, direct attacks by malicious individuals or software applications, dependencies on compromised third-party providers, and other security threats. Security systems are employed by websites to counteract the wide range of threats.

Many web applications utilize Application Programming Interfaces (APIs) based applications for functions like sales productivity, collaboration, marketing automation, and project tracking. API usage has increased as organizations have expanded their use of microservices and created new cloud-native applications. The consumer facing applications that the organizations create are often API based. Additionally, most internet traffic today is API driven. This API ecosystem is fueled by increases in public cloud environments, Kubernetes environments, serverless environments, and use of third-party Software As A Service (SaaS) systems. Developers can now roll out new API driven services in any environment. Critical information like personal information, financial information, health information, and the like is stored behind the applications that host these APIs. Malicious actors utilize these APIs as entry points to exfiltrate this information. However, it is difficult for security systems to counter malicious actors given the large and increasing number of APIs. This difficulty is compounded because of the uniqueness of each individual API. Differences in format and function from API to API inhibit largescale automated API testing as each API test must be specifically configured for the API of interest. Unfortunately, security systems do not effectively and efficiently test APIs to determine security vulnerabilities.

OVERVIEW

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for web security. Some embodiments comprise a method to detect security vulnerabilities in an Application Programming Interface (API). The method comprises monitoring API traffic and responsively generating contextual information that characterizes the operations of the API. The method further comprises generating an API test based on the contextual information to detect the security vulnerabilities in the API. The method further comprises executing the API test on the API. The method further comprises generating test results that indicate detected security vulnerabilities in the API. The method further comprises exporting the test results.

Some embodiments comprise one or more non-transitory computer-readable storage media having program instructions stored thereon to detect security vulnerabilities in an API. The program instructions, when executed by a computing system, direct the computing system to perform operations. The operations comprise monitoring API traffic and responsively generating contextual information that characterizes the operations of the API. The operations further comprise generating an API test based on the contextual information to detect the security vulnerabilities in the API. The operations further comprise executing the API test on the API. The operations further comprise generating test results that indicate detected security vulnerabilities in the API. The operations further comprise exporting the test results.

Some embodiments comprise an apparatus to detect security vulnerabilities in an Application Programming Interface (API). The apparatus comprises one or more computer-readable storage media, a processing system operatively coupled with the one or more computer-readable storage media, and program instructions stored on the one or more computer-readable storage media. When executed by the processing system, the program instructions direct the processing system to monitor API traffic and responsively generate contextual information that characterizes the operations of the API. The program instructions further direct the processing system to generate an API test based on the contextual information to detect the security vulnerabilities in the API. The program instructions further direct the processing system to execute the API test on the API. The program instructions further direct the processing system to generate test results that indicate detected security vulnerabilities in the API. The program instructions further direct the processing system to export the test results.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
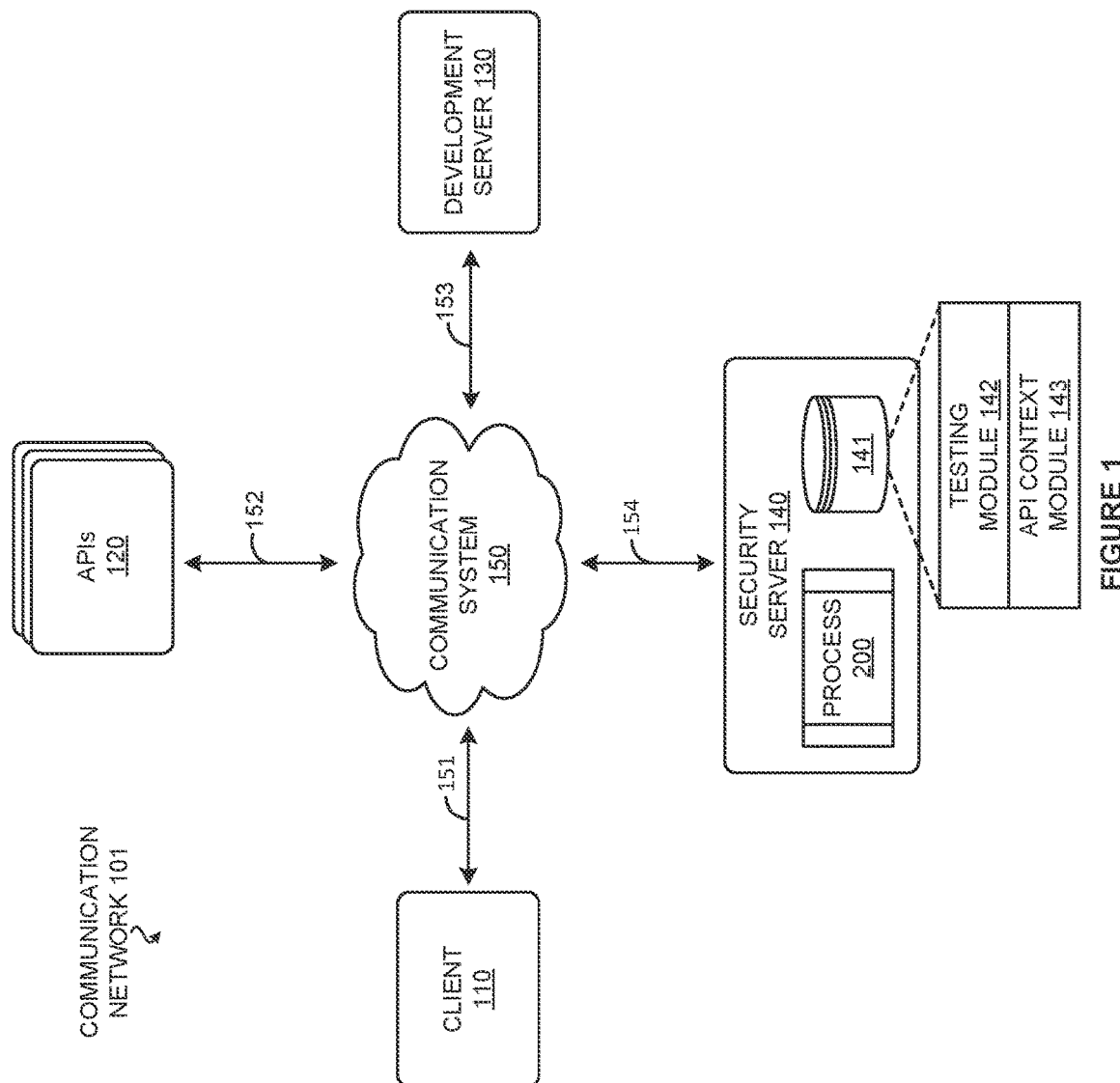
FIG. 1 illustrates an exemplary communication network to detect Application Programming Interface (API) security vulnerabilities.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments disclosed herein provide automatic generation of context-based Application Programming Interface (API) tests to determine security vulnerabilities in APIs. Conventional API testing is difficult and labor intensive. To address the issues associated with conventional API testing, the hardware and software components described herein monitor API traffic to develop contextual data that describe the expected operation of APIs. These components develop API tests based on the contextual data and perform the tests on the APIs. The tests attempt to drive the APIs to perform unauthorized, unexpected, or otherwise unwanted actions. The components generate test results that indicate any detected security vulnerabilities in the APIs. This knowledge enables customers to be able to counteract the detected vulnerabilities before the APIs are deployed to a production environment. Now referring to the Figures.

FIG. 1 comprises view 100. View 100 illustrates communication network 101 to detect security vulnerabilities in an API. Communication network 101 provides services like online networking, content distribution, web application services, web application security, and the like. Communication network 101 comprises client 110. APIs 120, development server 130, security server 140, communication system 150, and communication links 151-154. Security server 140 comprises process 200 and storage system 141. Storage system 141 comprises testing module 142 and context module 143. In other examples, communication network 101 may include fewer or additional components than those illustrated in FIG. 1. Likewise, the illustrated components of communication network 101 may include fewer or additional components, assets, or connections than shown. Each of client 110, APIs 120, development server 130, security server 140, and communication system 150 may be representative of a single computing apparatus or multiple computing apparatuses.

Various examples of network operation and configuration are described herein. In some examples, client 110 is representative of a client computing system that comprises a processing system and communication transceiver. Client 110 may also include other components such as a user interface, data storage system, and power supply. Examples of client 110 include mobile computing devices, such as cell phones, tablet computers, laptop computers, notebook computers, and gaming devices, as well as any other type of mobile computing devices and any combination or variation thereof. Examples of client computing system 110 also include desktop computers, server computers, and virtual machines, as well as any other type of computing system, variation, or combination thereof. Client 110 may load and execute a web browser to access APIs 120 over communication system 150. For example, client 110 may transfer API calls to APIs 120 to access the functionality of the called API. Exemplary API request types include GET requests, PUT requests, POST requests, and DELETE requests. The computing system of client 110 may reside in a single device or may be distributed across multiple devices and may be a discrete system or could be integrated within other systems, including other systems within communication network 101. In some examples, the computing system of client 110 could comprise a web server, Content Distribution Network (CDN), reverse proxy, load balancer, middleware, cloud server, network switch, router, switching system, packet gateway, network gateway system, Internet access node, application server, database system, service node, firewall, or some other communication system, including combinations thereof.

APIs 120 are representative of a set of API servers, computing systems, and/or network equipment configured to provide services and web resources to client 110. For example, APIs 120 may comprise a system that provides a cloud-based web service to client 110. APIs 120 may comprise client-side APIs and server-side APIs. APIs 120 may be representative of any computing apparatus, system, or systems that may connect to another computing system over a communication network. APIs 120 comprise a processing system and communication transceiver. APIs 120 may also include other components such as routers, data storage systems, and power supplies. APIs 120 may reside in a single device or may be distributed across multiple devices. APIs 120 may comprise discrete systems or may be integrated within other systems, including other systems within communication network 101. Some examples of computing systems that host APIs 120 include database systems, server computers, cloud computing platforms, and virtual machines, as well as any other type of computing system, variation, or combination thereof. The API servers can be in various different environments—cloud, Kubernetes, serverless, data center, and the like. The actual API server name then points to these environments. Client 110 may look up the IP address associated with the API server name using the Domain Name System (DNS) protocol.

Development server 130 may be provided by any computing apparatus, system, or systems that may connect to another computing system over a communication network.

Development server 130 is representative of a computing environment to build and update APIs 120. For example, server 130 may be representative of a continuous integration continuous deployment environment. When a new API is created or a code update is created for one or more of APIs 120, development server 130 notifies security server 140 before pushing the code change into production. The notification indicates the API that has been updated and a request to test the API. The computing apparatus of development server 130 may comprise storage systems that include components such as a processing system, storage system, router, server, and power supply. Development server 130 may reside in a single device or may be distributed across multiple devices. Development server 130 may be provided by a discrete system or may be provided by multiple systems, including other systems within communication network 101.

Security server 140 is representative of one or more computing devices configured to automatically generate API tests to detect security vulnerabilities in APIs 120. APIs 120 may provide access points for malicious actors due to inherent faults that exist in APIs 120. For example, APIs 120 may accept fraudulent user credentials, provide access to resources that should be non-accessible, provide unintended functionality, and the like. Prior to deploying one of APIs 120, security server 140 may generate an API test and run the test on the API to detect these security vulnerabilities. Security server 140 may comprise a server, a cloud computing system, or any other computing system, network equipment, apparatus, system, or systems that may connect to another computing system over a communication network. Security server 140 comprises a processing system and communication transceiver. Security server 140 may also include other components such as a router, server, data storage system, and power supply. Security server 140 may reside in a single device or may be distributed across multiple devices. Security server 140 may be a discrete system or may be integrated within other systems, including other systems within communication network 101. Some examples of security server 140 includes database systems, desktop computers, server computers, cloud computing platforms, and virtual machines, as well as any other type of computing system, variation, or combination thereof.

Figure 2:
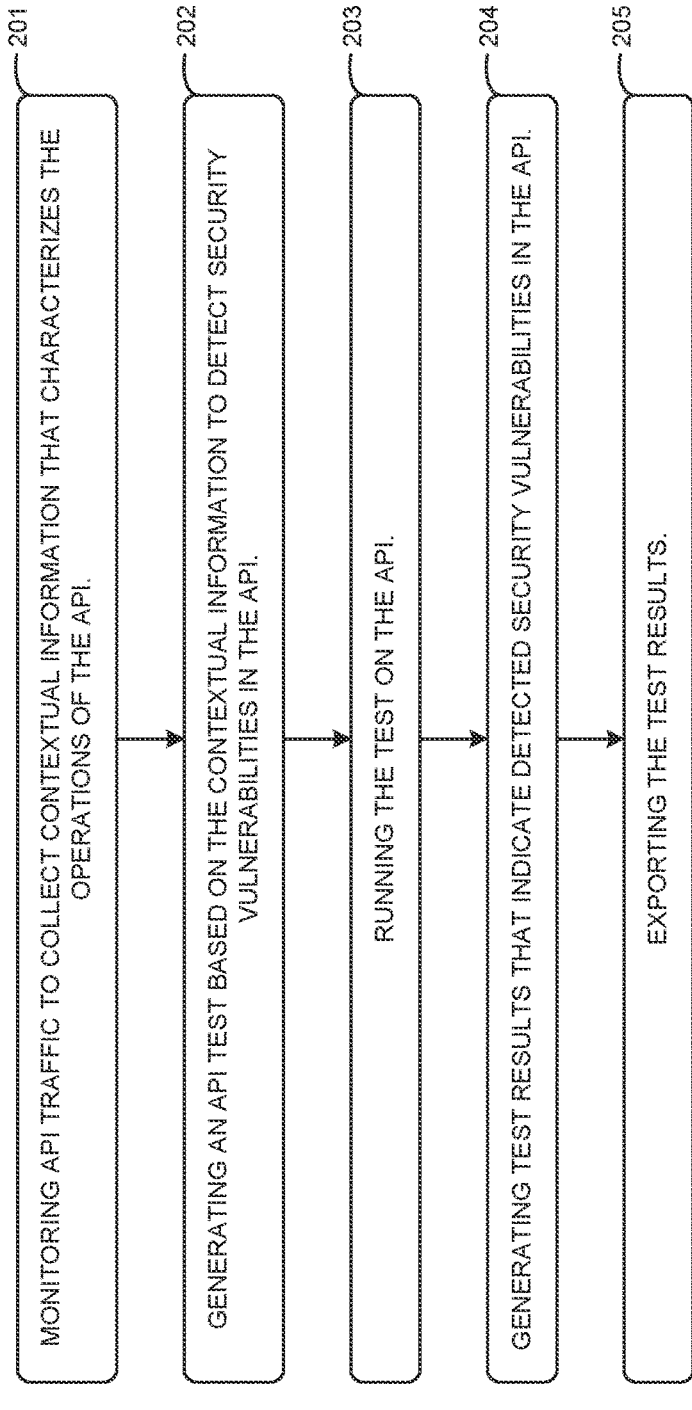
FIG. 2 illustrates an exemplary operation of the communication network to detect API security vulnerabilities.

In some examples, security server 140 is configured to implement process 200 described in FIG. 2. Security server 140 may be configured to execute software modules 142 and 143 to gather contextual information for APIs 120 and generate API tests for APIs 120 based on the gathered contextual information. Testing module 142 generates API tests to detect security vulnerabilities in APIs 120. API context module 143 monitors traffic to/from APIs 120, accesses API specifications for APIs 120, and determines user credentials for APIs 120 to characterize normal operating behavior of APIs 120. Testing module 142 automatically generates the API tests based on the gathered contextual information from API context module 143. The API tests comprise modified API requests to drive APIs 120 to perform unintended actions. For example, one of APIs 120 may be configured to receive GET requests and provide resources in response to the GET requests. The API test may modify the GET request to a DELETE request to drive API to delete the resource.

In some examples, security server 140 may comprise a crawler module to uncover endpoints associated with APIs 120. The crawler module determines API endpoints and paths for APIs 120 based on commonly used API endpoints in publicly available open API specifications. The crawler module determines ancillary endpoints that typically exist with these APIs even though they are not documented in API specifications. Examples of ancillary endpoints include /api/ health, /api/version, /api/metrics, and the like. The crawler module determines API endpoints based on documented open API specifications of an organization from their development teams and runtime environments. The crawler module transfers API requests to different URLs based on DNS data and the API endpoint data.

Communication system 150 could comprise multiple network elements such as routers, gateways, telecommunication switches, servers, processing systems, or other communication equipment and systems for providing communication and data services. In some examples, communication system 150 could comprise wireless communication nodes, telephony switches, Internet routers, network gateways, computer systems, communication links, or some other type of communication equipment, including combinations thereof. Communication system 150 may also comprise optical networks, packet networks, local area networks (LAN), metropolitan area networks (MAN), wide area networks (WAN), or other network topologies, equipment, or systems, including combinations thereof. Communication system 150 may be configured to communicate over wired or wireless communication links. Communication system 150 may be configured to use Internet Protocol (IP), Ethernet, optical networking, wireless protocols, communication signaling, or some other communication format, including combinations thereof. In some examples, communication system 150 includes further access nodes and associated equipment for providing communication services to several computer systems across a large geographic region.

Client 110, APIs 120, development server 130, security server 140, and communication system 150 comprise microprocessors, software, memories, transceivers, bus circuitry, and the like. The microprocessors comprise Central Processing Unit (CPU), Graphical Processing Unit (GPU), Digital Signal Processor (DSP), Application-Specific Integrated Circuit (ASIC), Field Programmable Gate Array (FPGA), analog computing circuit, and/or types of processing circuitry. The memories comprise Random Access Memory (RAM), Solid State Drive (SSD), Hard Disk Drive (HDD), Non-Volatile Memory Express (NVMe) SSD, and/ or the like. The memories store software like operating systems, security modules, user applications, web applications, and browser applications. The microprocessors retrieve the software from the memories and execute the software to drive the operation of communication network 101 as described herein. Communication links 151-154 that connect the elements of communication network 101 use metallic links, glass fibers, radio channels, or some other communication media. The communication links use Time Division Multiplex (TDM), Data Over Cable System Interface Specification (DOCSIS), Internet Protocol (IP), General Packet Radio Service Transfer Protocol (GTP), Institute of Electrical and Electron Engineers (IEEE) 802.11 (WiFi), IEEE 802.3 (Ethernet), virtual switching, inter-processor communication, bus interfaces, and/or some other data communication protocols. Client 110, APIs 120, development server 130, security server 140, and communication system 150 may exist as unified computing devices or may be distributed between multiple computing devices.

Figure 3:
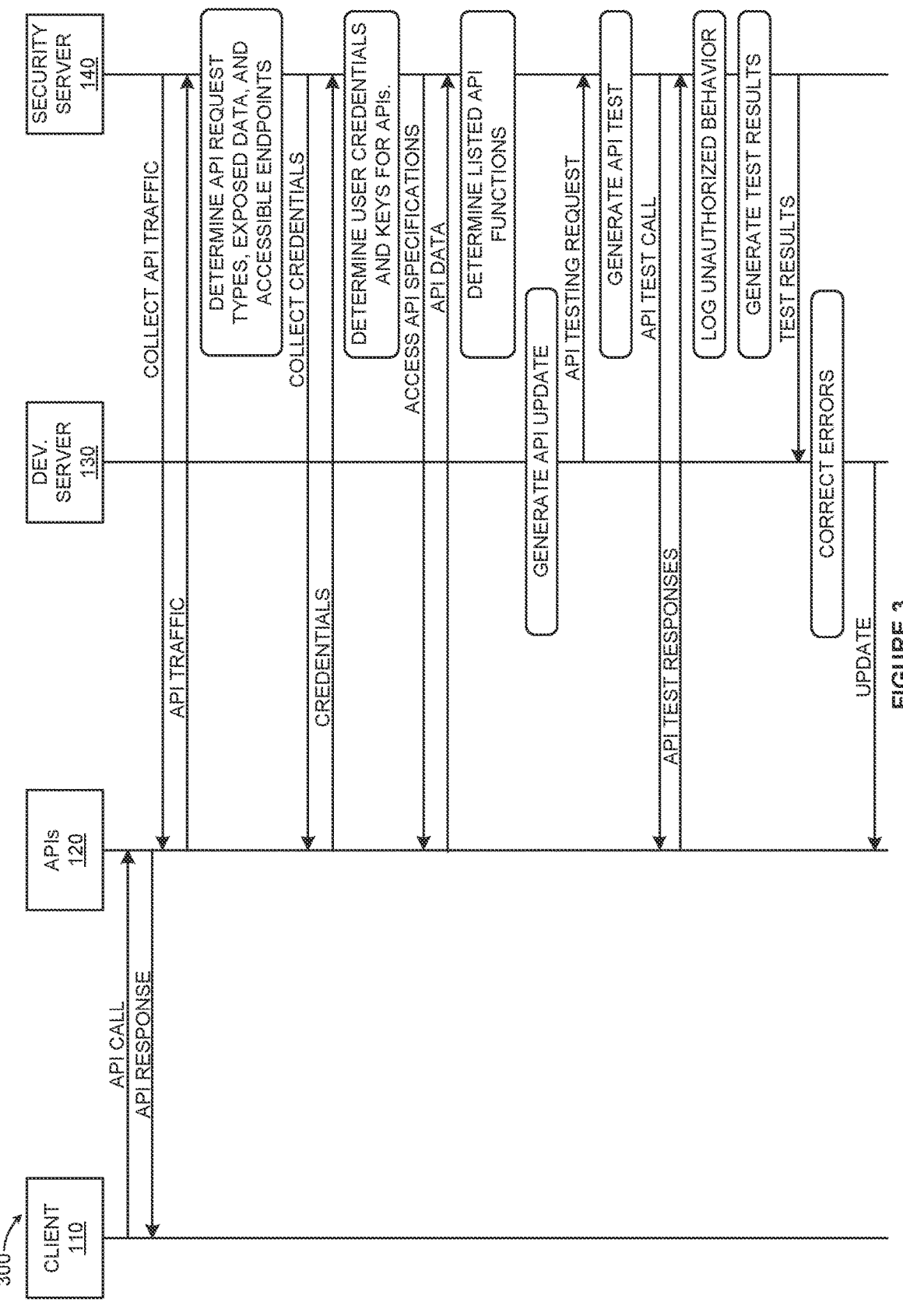
FIG. 3 illustrates an exemplary operation of the communication network to detect API security vulnerabilities.

In some examples, communication network 101 implements process 200 illustrated in FIG. 2 and/or process 300 illustrated in FIG. 3. It should be appreciated that the structure and operation of communication network 101 may differ in other examples.

FIG. 2 illustrates process 200. Process 200 comprises an automated process to generate API tests to detect API security vulnerabilities. Process 200 may be implemented in program instructions in the context of any of the software applications, module components, or other such elements of one or more computing devices. The program instructions direct the computing devices(s) to operate as follows, referred to in the singular for the sake of clarity.

The operations of process 200 comprise monitoring API traffic to collect contextual information that characterizes the operations of the API (step 201). The operations further comprise generating an API test based on the contextual information to detect security vulnerabilities in the API (step 202). The operations further comprise running the API test (step 203). The operations further comprise generating test results that indicate detected security vulnerabilities in the API (step 204). The operations further comprise exporting the test results (step 205).

Referring back to FIG. 1, communication network 101 includes a brief example of process 200 as employed by one or more applications hosted by security server 140. The operation may differ in other examples.

In some examples, client 110 transfers API calls to APIs 120 over communication system 150. APIs 120 respond to the to the calls by transferring API response to client 110. The responses may include requested data, services, and the like. Context module 143 monitors the API traffic to collect contextual data characterizing the behavior of APIs 120 (step 201). For example, context module 143 may monitor the traffic to determine the type of API requests (e.g., GET requests), the type of data exposed by APIs 120 (e.g., user information), endpoint servers accessible through APIs 120, and the like. Context module 143 generates API context information for APIs 120 that indicates the expected behavior of APIs 120. Module 143 indicates the context information to testing module 142.

API testing module 142 generates API tests for APIs 120 based on the API context information (step 203). API testing module 142 may generate API tests in response to a request (e.g., from development server 130) and/or based on a testing schedule. For example, development server 130 may request an API test be performed before an API update or new API is pushed to production. The tests comprise API calls that attempt to drive APIs 120 to exhibit unauthorized or otherwise unsuspected behavior. For example, the API context information may indicate that one of APIs 120 provides access to data types A, B, and C. To test this API, API testing module 142 may generate an API call for that API to access data type D which should not be accessible by the API. Testing module 142 runs the API tests by transferring test API calls to APIs 120 over communication system 150 (step 203).

APIs 120 respond to the test API calls by transferring API responses to testing module 142. When APIs 120 do not exhibit unauthorized behavior, these API responses typically comprise null or error values indicating that the request could not be completed. Such responses indicate that APIs 120 did not exhibit unauthorized behavior as APIs 120 failed to take prohibited actions to complete the API test. When APIs 120 exhibit unauthorized behavior, these API responses typically indicate that the request was completed. For example, APIs 120 may return sensitive user information that should not be accessible to testing module 142. Testing module 142 categorizes any unauthorized behaviors exhibited by APIs 120 and generates test results that indicate these security vulnerabilities (step 204). Testing module 142 exports the test results (step 205). For example, module 142 may transfer the test results to development server 130 for review by human operators.

Advantageously, security server 140 effectively and efficiently identifies security vulnerabilities in APIs. Moreover, security server 140 performs automated generation of API tests.

FIG. 3 illustrates process 300. Process 300 comprises an exemplary operation of communication network 101 to detect API security vulnerabilities. Process 300 comprises an example of process 200 illustrated in FIG. 2, however process 200 may differ. In some examples, client 110 transfers API calls for delivery to APIs 120 over communication system 150 to access one or more of APIs 120. The API calls comprise a URL address that points to an API endpoint of APIs 120 that client 110 wants to access. The API calls may comprise GET requests, PUT requests, POST requests, and DELETE requests. Typically, the type of API calls transferred by client 110 depends in part on the functionality of the API that client 110 intends to access. For example, an API may provide access to an information resource like an online book library. If client 110 wishes to access the online book library accessible by the API, client 110 transfers GET requests to the API. The requests sent to APIs 120 and the data received from APIs 120 comprise API traffic.

Security server 140 executes context module 143 to generate API context information. Context module 143 collects and processes the API traffic to and from APIs 120. Context module 143 determines the types of requests, the types of services, the accessible endpoints from the APIs, the data types accessible from the API, and the like. Context module 143 interrogates APIs 120 to retrieve user credentials like security keys used to access APIs 120. Context module 143 retrieves open API specifications for APIs 120 to determine listed functions and expected behavior of APIs 120. The open API specifications may be located with APIs 120 or may be available at another network location (e.g., an API specification database). Context module 143 generates context for each of APIs 120 that indicates the types of requests, the types of services, the accessible endpoints from the API, the data types accessible from the API, user credentials, security keys, listed functions, and expected behavior. Context module 143 stores the context in associations with each of APIs 120.

Development server 130 generates a code change for one of APIs 120. The code change may fix bugs, add additional functionality, create a new API, and the like. Before the code change is pushed to production, development server 130 transfers a test request to security server 140. The test request identifies the API affected by the code change and/or the newly instantiated API.

Security server 140 receives the test request and responsively executes testing module 142. Testing module 142 correlates the API identified in the in the test request with the context for the API gathered by context module 143. Testing module 142 generates an API test based on the API contextual data. The API test comprises API requests modified to cause the API to exhibit unauthorized or otherwise unwanted behavior. For example, the contextual information may indicate the format of typical API requests received by the API including request type, accessed API endpoints, security keys used to access the API, fields included in the request, and/or other information that characterizes API requests received by the API. Testing module 142 generates API requests that comprise attributes not present in the normal requests received by the API. For example, the test API requests may comprise additional fields, request types not fielded by the API, addressed for non-accessible endpoints, modified keys, and the like. Testing module 142 transfers the modified API requests to the API.

Testing module 142 catalogues the responses received from the API. In some examples, the modified requests may not elicit a valid response from the API indicating the absence of a security vulnerability in the API. In some examples, the modified requests may elicit valid response from the API indicating the presence of a security vulnerability. For example, a modified API request may utilize invalid user credentials and the API may accept the invalid credentials as valid. Testing module 142 generates test results that indicate the responses received from the API. The test results indicate the security vulnerabilities in the API like acceptance of invalid security credentials, API endpoints that should not exist, API functionality that should not exist, and/or other types of security vulnerabilities. Security server 142 exports the test results for delivery to development server 130. In other examples, security server 142 may store the test results in memory. Development server 130 receives the test results. When the test results indicate the updated or newly instantiated API exhibits unauthorized behavior, development server 130 modifies the update to prevent the API from exhibiting unauthorized behavior. Development server 130 pushes the API update to production.

Figure 4:
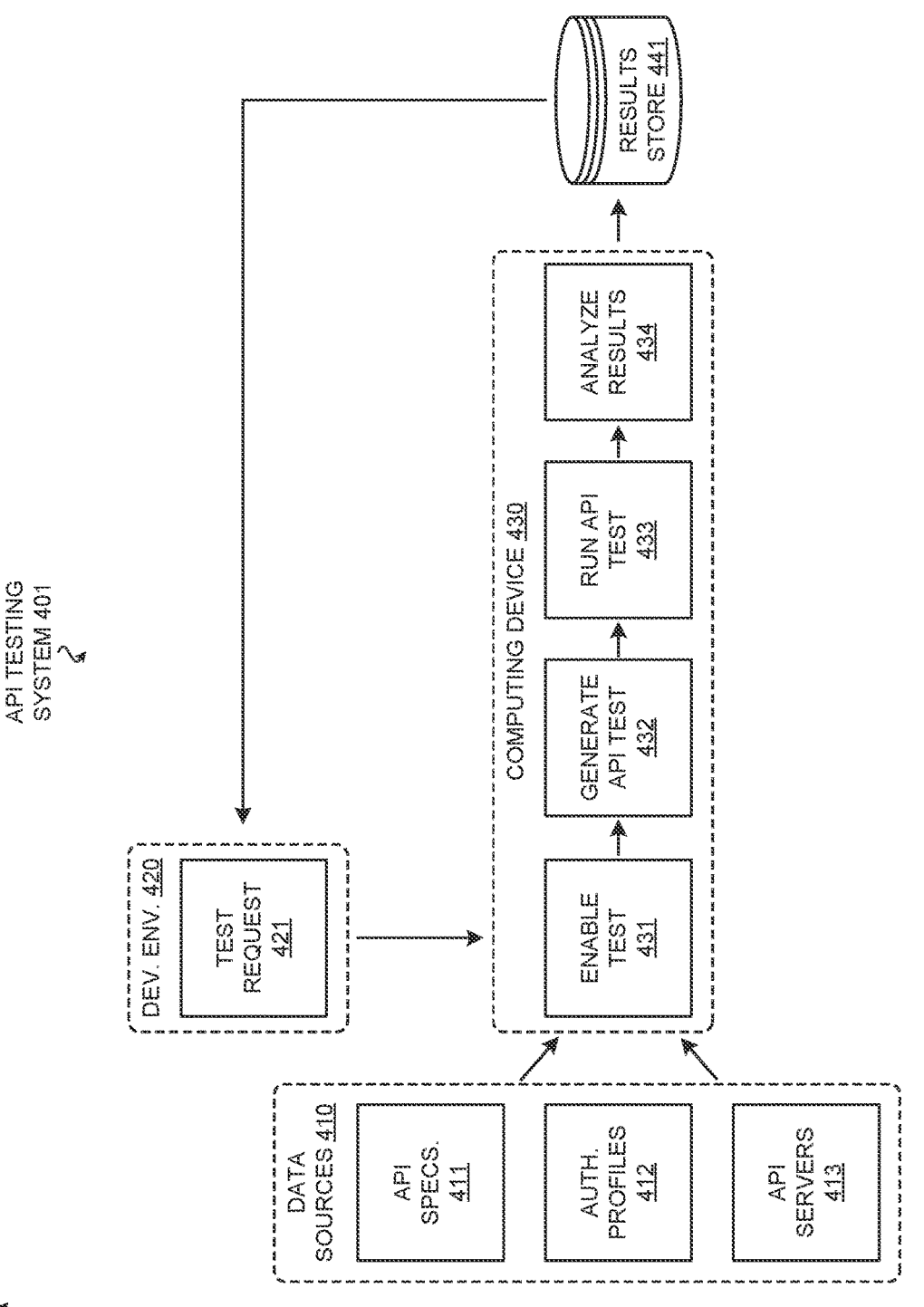
FIG. 4 illustrates an exemplary API testing system to detect API security vulnerabilities.

FIG. 4 comprises view 400. View 400 illustrates API testing system 401 to detect API security vulnerabilities. API testing system 401 comprises an example of communication network 101, however network 101 may differ. API testing system 401 comprises data sources 410, development environment (DEV. ENV.) 420, computing device 430, and results store 441. Data sources 410 comprises API specifications 411, authentication (AUTH.) profiles 412, and API servers 413. Development environment 420 comprises test request 421. Computing device 430 hosts one or more computing modules to implement process blocks 431-434. Blocks 431-434 comprise enable test 431, generate API test 432, run API test 433, and analyze results 434. Blocks 431-434 may be implemented in program instructions in the context of any of the software applications, module components, or other such elements of one or more computing devices. In other examples, system 401 may include fewer or additional components than those illustrated in FIG. 4. Likewise, the illustrated components of system 401 may include fewer or additional components, assets, or connections than shown. Each of data sources 410, development environment 420, computing device 430, and results store 441 may be representative of a single computing apparatus or multiple computing apparatuses.

In some examples, computing device 430 monitors API traffic to and from API servers 413 in a production environment to generate API contextual data. Computing device 430 may utilize a service like Postman Collection to gather API contextual data like endpoints addresses, authentication mechanisms, API request format, and the like. Computing device 430 accesses API specifications 411 to determine API schemas for APIs in the production environment. Computing device 430 retrieves authentication profiles 412 used to access the APIs in the production environment. Computing device 430 determines keys, authentication policies, user access levels, and the like for the APIs based on the profiles. Computing device 430 determines API endpoint addresses (e.g., API servers 413) associated with the API. Endpoint identification may be performed manually (e.g., receive a server address) or automatically (e.g., calling endpoints to determine existence). Computing device 430 correlates the retrieved contextual information for each API in the production environment.

Development environment 420 is representative of a continuous integration continuous deployment environment that builds/updates APIs. When development environment 420 generates a code update for an API, environment 420 transfers test request 421 to computing device 430. For example, the code update may invoke Dynamic Application Security Testing (DAST) to be performed by computing device 430. Test request 421 indicates the updated API and drives computing device 430 to enable testing of the API (enable test 431). Computing device 430 receives the test request. In response to the enabling of the test, computing device 430 identifies the contextual information like known endpoints, authentication mechanisms, user profiles/permissions, schema, call formats, request types, and/or other contextual information associated with the indicated API. Computing device 430 automatically generates API tests (generate API test 432) based on the contextual information to determine security vulnerabilities in the updated API prior to the API's deployment in the production environment. The API tests comprise malicious API requests intended to drive the API behave erroneously. For example, the API requests may attempt to access sensitive data using invalid security credentials, utilize faulty keys, access unavailable endpoints, perform unauthorized actions, and the like. Exemplary context-based API tests include broken object level authorization, broken user authentication, excessive data exposure, lack or resources and rate limiting, broken function level authorization, mass assignment, security misconfiguration, injection, improper assets management, and insufficient logging and monitoring. By basing the API tests on the contextual data, computing device 430 may more readily generate malicious requests for the API. For example, by knowing the format of API requests, computing device 430 may generate malicious requests that comprise the known format.

Computing device 430 transfers the malicious requests to the API to conduct the API tests (run API test 433). Computing device 430 receives and catalogues the API responses received in response to the requests. Computing device 430 determines which of the responses resulted in erroneous behavior in the API (analyze results 434). For example, computing device 430 may transfer an API call that comprises a faulty key to the API. Computing device 430 may characterize the corresponding API response as to whether the faulty key was accepted or rejected by the API. However, it should be appreciated that the type of characterization will depend in part on the type of malicious behavior elicited by the request. Computing devices 430 stores the test results in results store 441. Results store 441 may export the test results to development environment 420 automatically or per request.

Figure 5:
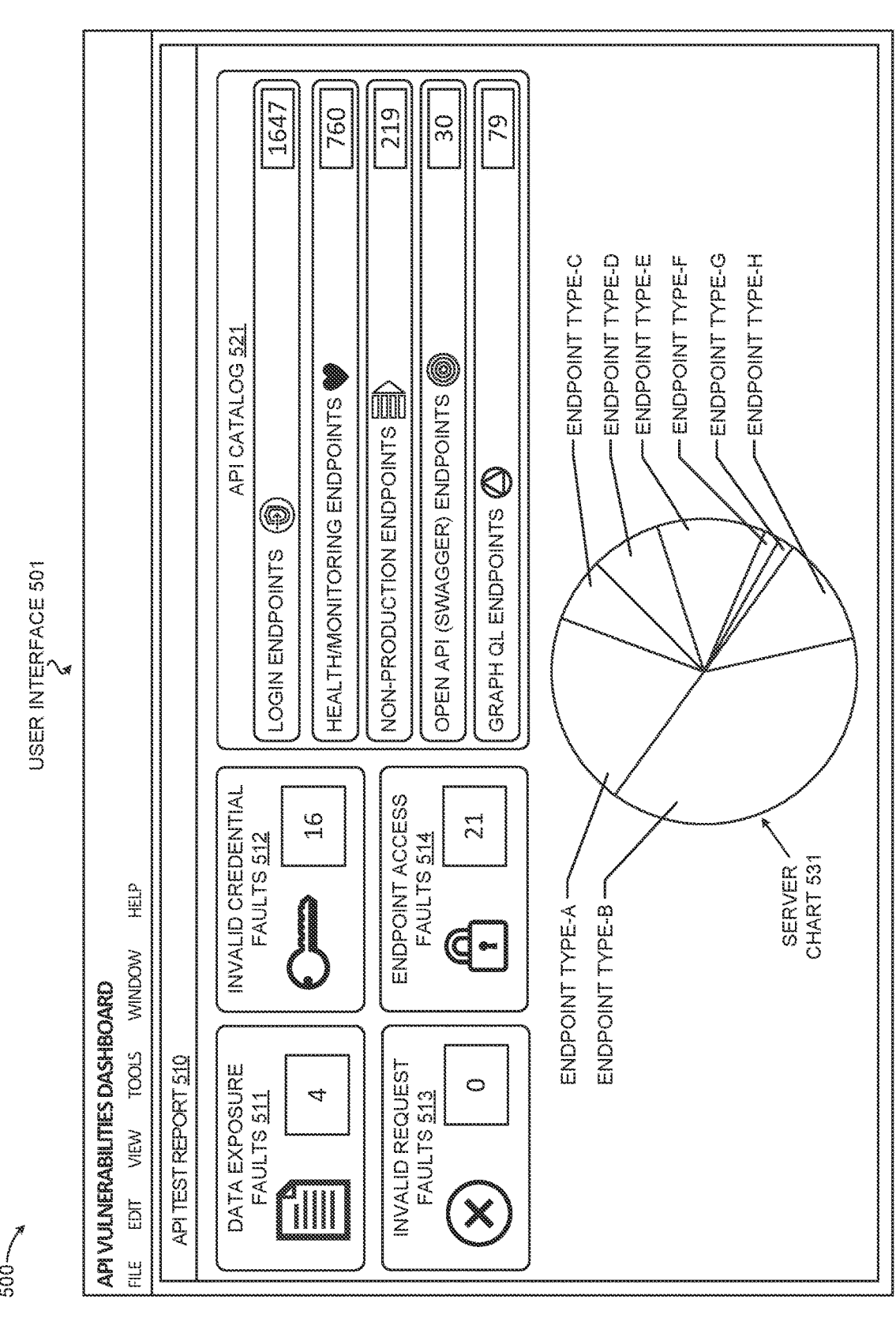
FIG. 5 illustrates an exemplary user interface to detect API security vulnerabilities.

FIG. 5 illustrates view 500. View 500 comprises user interface 501 to detect API security vulnerabilities. For example, communication network 101 may implement process 200 to generate user interface 501 illustrated in FIG. 5. In other examples, user interface 501 may differ. User interface 501 may be displayed on devices like a user computer, tablet computer, smartphone, and the like. User interface 501 comprises a Graphical User Interface (GUI) configured to allow a user to view API test report 510. The GUI provides visualizations to indicate security vulnerabilities detected in one or more APIs based on API testing. In other examples, the GUI of user interface 501 may differ.

User interface 501 comprises API test report 510. For example, user interface 501 may present a selectable option that, in response to user action, drives user interface 501 to display API test report 510. In some examples, the computing device displaying user interface 501 may receive a hyperlink (e.g., via email) that links to API test report 510. User interface 501 may present the hyperlink on the display system of the computing device. A user may select the hyperlink which drives the computing device to download and display API test report 510 on interface 501 for review by a user.

API test report 510 comprises visual indicators 511-514, API catalog 521, and server chart 531. Visual indicators 511-514 characterize security vulnerabilities uncovered as a result of automatic API testing. In this example, indicators 511-514 comprise data exposure faults 511, invalid credential faults 512, invalid request faults 513, and endpoint access faults 514. Each of indicators 511-514 indicate the type and number of API faults detected during the API testing. In other examples, API test report 510 may comprise different, fewer, or additional visual indicators to categorize identified API security vulnerabilities. API catalog 521 identifies API endpoints for an organization by type and by number. The endpoint types and numbers included in API catalog 521 are exemplary and may differ in other examples. Server chart 531 comprises a pie chart to categorize the proportion of API server endpoints by type. In this example, server chart 531 categorizes endpoints of type-A to type-H. In other examples, chart 531 may differ.

Figure 6:
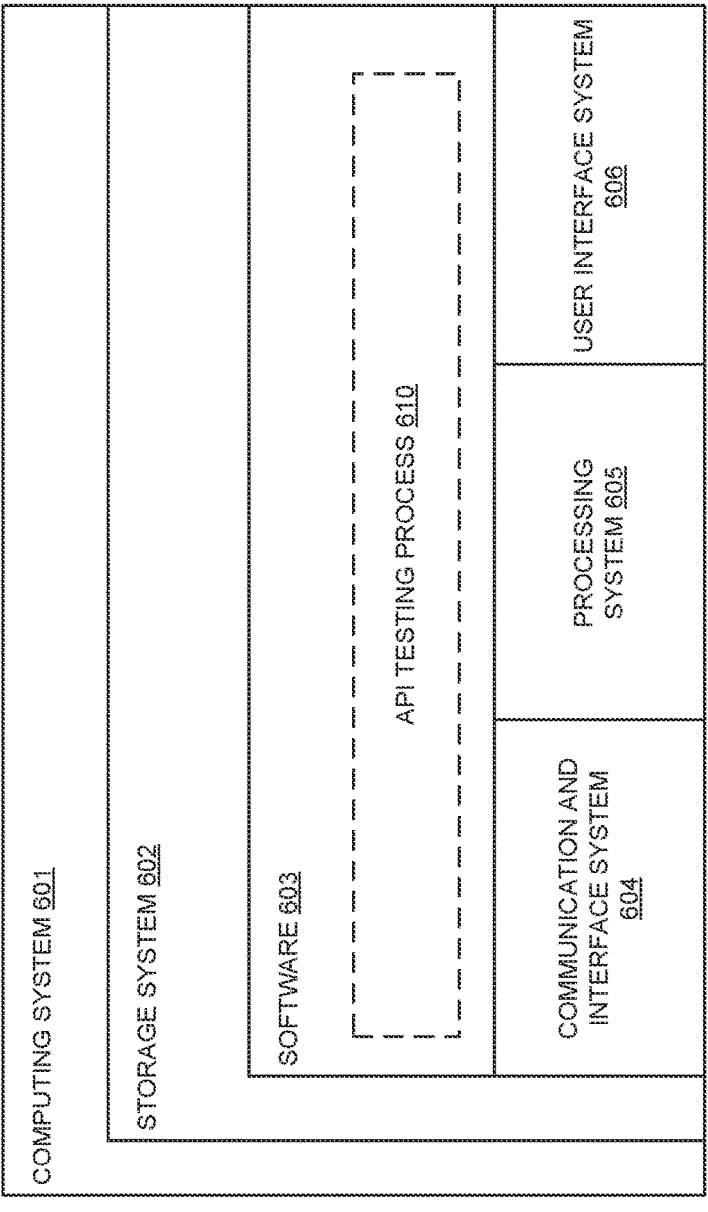
FIG. 6 illustrates an exemplary computing device to detect API security vulnerabilities.

FIG. 6 comprises view 600. View 600 illustrates computing device 601 which is representative of any system or collection of systems in which the various processes, programs, services, and scenarios disclosed herein to automatically generate API tests may be implemented. For example, computing device 601 may be representative of client 110, APIs 120, development server 130, security server 140, communication system 150, data sources 410, development environment 420, computing device 430, results store 441, and/or any other computing device contemplated herein. Examples of computing system 601 include, but are not limited to, server computers, routers, web servers, cloud computing platforms, and data center equipment, as well as any other type of physical or virtual server machine, physical or virtual router, container, and any variation or combination thereof.

Computing system 601 may be implemented as a single apparatus, system, or device or may be implemented in a distributed manner as multiple apparatuses, systems, or devices. Computing system 601 includes, but is not limited to, storage system 602, software 603, communication and interface system 604, processing system 605, and user interface system 606. Processing system 605 is operatively coupled with storage system 602, communication interface system 604, and user interface system 606.

Processing system 605 loads and executes software 603 from storage system 602. Software 603 includes and implements API testing process 610, which is representative of the automated API testing processes to determine security vulnerabilities in an API as described in the preceding Figures. For example, API testing process 610 may be representative of process 200 illustrated in FIG. 2 and/or process 300 illustrated in FIG. 3. When executed by processing system 605, software 603 directs processing system 605 to operate as described herein for at least the various processes, operational scenarios, and sequences discussed in the foregoing implementations. Computing system 601 may optionally include additional devices, features, or functionality not discussed here for purposes of brevity.

Processing system 605 may comprise a micro-processor and other circuitry that retrieves and executes software 603 from storage system 602. Processing system 605 may be implemented within a single processing device but may also be distributed across multiple processing devices or subsystems that cooperate in executing program instructions. Examples of processing system 605 include general purpose central processing units, graphical processing units, application specific processors, and logic devices, as well as any other type of processing device, combinations, or variations thereof.

Storage system 602 may comprise any computer readable storage media that is readable by processing system 605 and capable of storing software 603. Storage system 602 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 602 may also include computer readable communication media over which at least some of software 603 may be communicated internally or externally. Storage system 602 may be implemented as a single storage device but may also be implemented across multiple storage devices or sub-systems co-located or distributed relative to each other. Storage system 602 may comprise additional elements, such as a controller, capable of communicating with processing system 605 or possibly other systems.

Software 603 (including API testing process 610) may be implemented in program instructions and among other functions may, when executed by processing system 605, direct processing system 605 to operate as described with respect to the various operational scenarios, sequences, and processes illustrated herein. For example, software 603 may include program instructions for monitoring API traffic to generate contextual information characterizing normal operations of an API, automatically generating an API test based on the contextual information, and generating test results that indicate detected security vulnerabilities in the API as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 603 may include additional processes, programs, or components, such as operating system software, virtualization software, or other application software. Software 603 may also comprise firmware or some other form of machine-readable processing instructions executable by processing system 605.

In general, software 603 may, when loaded into processing system 605 and executed, transform a suitable apparatus, system, or device (of which computing system 601 is representative) overall from a general-purpose computing system into a special-purpose computing system customized to automatically generate API tests to detect security vulnerabilities as described herein. Indeed, encoding software 603 on storage system 602 may transform the physical structure of storage system 602. The specific transformation of the physical structure may depend on various factors in different implementations of this description. Examples of such factors may include, but are not limited to, the technology used to implement the storage media of storage system 602 and whether the computer-storage media are characterized as primary or secondary storage, as well as other factors.

For example, if the computer readable storage media are implemented as semiconductor-based memory, software 603 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 604 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples provided herein are described in the context of computing devices to detect API security vulnerabilities through automated API testing, it should be understood that the systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A method to detect security vulnerabilities in an Application Programming Interface (API), the method comprising:

collecting API traffic to determine API request types, data exposed by the API, and endpoints accessible by the API and responsively generating contextual information that indicates the API request types, the data exposed by the API, and the endpoints accessible by the API to characterize expected operations of the API;

generating an API test that comprises a modified API call to drive the API to perform an unauthorized operation based on the contextual information to detect the security vulnerabilities in the API, wherein the modified API call comprises a different API request type than the API request types indicated by the contextual information;

executing the API test on the API by transferring the modified API call to the API;

receiving an API response to the modified API call;

generating test results based on the API response that indicate detected security vulnerabilities in the API; and exporting the test results.

2. The method of claim 1 wherein the API request types indicated by the contextual information comprise one or more of a GET request, a PUT request, a POST request, or a DELETE request and the different API request type comprises a different one of the GET request, PUT request, POST request, or DELETE request.

3. The method of claim 1 further comprising:

collecting user credentials and keys used to access the API; and wherein:

the contextual information indicates the user credentials and the keys.

4. The method of claim 1 further comprising:

accessing an open API specification for the API to determine listed API functions for the API; and wherein:

the contextual information indicates the listed API functions.

5. The method of claim 1 further comprising:

collecting user credentials and keys used to access the API;

accessing an open API specification for the API to determine listed API functions for the API; and wherein:

the contextual information indicates the API request types, the data exposed by the API, the endpoints accessible by the API, the user credentials, the keys, and the listed API functions.

6. The method of claim 1 wherein the modified API request comprises the different API request type and one or more of a request to access a different data or a request to access a different endpoint than the data exposed by the API and the endpoints accessible by the API indicated by the contextual information.

7. The method of claim 1 wherein the modified API request comprises the different API request type and altered authentication keys used to access the API.

8. The method of claim 1 wherein the API test modified API request comprises altered authentication keys used to access the API and the different API request type, a request to access a different data, and a request to access a different endpoint than the API request types, the data exposed by the API, and the endpoints accessible by the API indicated by the contextual information.

9. The method of claim 1 further comprising:

categorizing unauthorized API behaviors performed by the API; and wherein:

the test results indicate the unauthorized API behaviors performed by the API.

10. One or more non-transitory computer-readable storage media having program instructions stored thereon to detect security vulnerabilities in an Application Programming Interface (API), wherein the program instructions, when executed by a computing system, direct the computing system to perform operations, the operations comprising:

collecting API traffic to determine API request types, data exposed by the API, and endpoints accessible by the API and responsively generating contextual information that indicates the API request types, the data exposed by the API, and the endpoints accessible by the API to characterize expected operations of the API;

generating an API test that comprises a modified API call to drive the API to perform an unauthorized operation based on the contextual information to detect the security vulnerabilities in the API, wherein the modified API call comprises a different API request type than the API request types indicated by the contextual information;

executing the API test on the API by transferring the modified API call to the API;

generating test results based on the API response that indicate detected security vulnerabilities in the API; and exporting the test results.

11. The one or more computer-readable storage media of claim 10 wherein the API request types indicated by the contextual information comprise one or more of a GET request, a PUT request, a POST request, or a DELETE request and the different API request type comprises a different one of the GET request, PUT request, POST request, or DELETE request.

12. The one or more computer-readable storage media of claim 10, the operations further comprising:

collecting user credentials and keys used to access the API; and wherein:

the contextual information indicates the user credentials and the keys.

13. The one or more computer-readable storage media of claim 10, the operations further comprising:

accessing an open API specification for the API to determine listed API functions for the API; and wherein:

the contextual information indicates the listed API functions.

14. The one or more computer-readable storage media of claim 10, the operations further comprising:

collecting user credentials and keys used to access the API;

accessing an open API specification for the API to determine listed API functions for the API; and wherein:

the contextual information indicates the API request types, the data exposed by the API, the endpoints accessible by the API, the user credentials, the keys, and the listed API functions.

15. The one or more computer-readable storage media of claim 10 wherein the modified API request comprises the different API request type and one or more of a request to access a different data or a request to access a different endpoint than the data exposed by the API and the endpoints accessible by the API indicated by the contextual information.

16. The one or more computer-readable storage media of claim 10 wherein modified API request comprises the different API request type and altered authentication keys used to access the API.

17. The one or more computer-readable storage media of claim 10 wherein the modified API request comprises altered authentication keys used to access the API and the different API request type, a request to access a different data, and a request to access a different endpoint than the API request types, the data exposed by the API, and the endpoints accessible by the API indicated by the contextual information.

18. The one or more computer-readable storage media of claim 10, the operations further comprising:

categorizing unauthorized API behaviors performed by the API; and wherein:

the test results indicate the unauthorized API behaviors performed by the API.

19. An apparatus to detect security vulnerabilities in an Application Programming Interface (API), the apparatus comprising:

one or more computer-readable storage media;

a processing system operatively coupled with the one or more computer-readable storage media; and program instructions stored on the one or more computer-readable storage media that, when executed by the processing system, direct the processing system to at least:

collect API traffic to determine API request types, data exposed by the API, and endpoints accessible by the API and responsively generate contextual information that indicates the API request types, the data exposed by the API, and the endpoints accessible by the API to characterize expected operations of the API;

generate an API test that comprises a modified API calls to drive the API to perform an unauthorized operation based on the contextual information to detect the security vulnerabilities in the API, wherein the modified API calls comprise a different API request type than the API request types indicated by the contextual information;

execute the API test on the API by transferring the modified API calls to the API;

receive API responses to the modified API calls;

generate test results based on the API responses that indicate detected security vulnerabilities in the API; and export the test results.

20. The apparatus of claim 19 wherein the programming instructions further direct the processing system to:

collect user credentials and keys used to access the API;

access an open API specification for the API to determine listed API functions for the API; and wherein:

the contextual information indicates the API request types, the data exposed by the API, the endpoints accessible by the API, the user credentials, the keys, and the listed API functions; and the modified API requests comprise altered authentication keys and altered user credentials used to access the API, requests for different API functions, the different API request type, a request to access a different data, and a request to access a different endpoint than the API request types, the data exposed by the API, the endpoints accessible by the API, the user credentials, the keys, and the listed API functions indicated by the contextual information; and the programming instructions further direct the processing system to categorize unauthorized API behaviors performed by the API; and wherein:

the test results indicate the unauthorized API behaviors performed by the API.

\* \* \* \* \*